United States Patent [19]

Wu

[11] Patent Number: 5,732,601
[45] Date of Patent: Mar. 31, 1998

[54] COUPLING DEVICE FOR BRAKE CABLES OF BICYCLES

[76] Inventor: Chin-chang Wu, No. 9, Alley 12, Lane 108, Yungfeng Rd., Taiping Hsiang, Taichung Hsien, Taiwan

[21] Appl. No.: 732,053

[22] Filed: Oct. 17, 1996

[51] Int. Cl.[6] .................................................. F16C 1/10
[52] U.S. Cl. ................ 74/502.4; 188/24.11; 74/501.5 R
[58] Field of Search ....................... 74/501.5 R–502.6; 188/24.11–24.22, 2 D

[56] References Cited

U.S. PATENT DOCUMENTS

| | | | |
|---|---|---|---|
| 2,160,181 | 5/1939 | Taylor | 188/24.11 |
| 3,782,507 | 1/1974 | Shreve | 188/2 D |
| 3,861,714 | 1/1975 | Evans et al. | 188/24.11 |
| 3,942,609 | 3/1976 | Hill | 188/24.11 |
| 4,026,390 | 5/1977 | Yoshigai | 188/24.11 |
| 4,057,127 | 11/1977 | Woodring | 188/24.11 |
| 4,480,720 | 11/1984 | Shimano | 188/24.15 |
| 4,877,112 | 10/1989 | Malinoski | 188/24.22 |
| 4,896,750 | 1/1990 | Tseng | 188/24.19 |
| 5,368,136 | 11/1994 | Walte | 188/24.22 |
| 5,505,105 | 4/1996 | Kuo | 74/502.6 |
| 5,560,260 | 10/1996 | Kuo | 74/502.4 |

FOREIGN PATENT DOCUMENTS

| 435978 | 5/1948 | Italy | 74/502.4 |
|---|---|---|---|

*Primary Examiner*—Vinh T. Luong
*Attorney, Agent, or Firm*—Staas & Halsey

[57] ABSTRACT

A coupling device includes a frame with a first flange extending from a top end thereof and a second flange extending from a lower end of the frame, a first bolt threadedly extending through the first flange with a passage defined longitudinally in the first bolt for a first brake cable extending therethrough, a connecting block composed of a first part and a second part and being disposed between the first flange and the second flange, the first part and the second part each having three recesses defined therein, each of the first part and the second part having three notches defined therein for respectively communicating with the recess corresponding thereto such that the first brake cable and two second brake cables have their heads respectively received in the three recesses.

3 Claims, 4 Drawing Sheets

COUPLING DEVICE FOR BRAKE CABLES OF BICYCLES

BACKGROUND OF THE INVENTION

1. Field of the Invention

The present invention relates to a coupling device and more particularly, to an improved coupling device for connecting front brake cables cooperated with a swivel mechanism of a bicycle.

2. Brief Description of the Prior Art

Swivel mechanisms have been developed in the past few years to allow the handlebars of a bicycle to be rotated 360 degrees without tangling the front brake cables on the head tube or the handlebar stem. U.S. Pat. No. 4,770,435 entitled as "Freestyle Bicycle Construction" shows a general type of swivel mechanism. Applicant has filed an application on Aug. 29, 1995 entitled as "Swivel Mechanism For a Bicycle" which shows an improved swivel mechanism used on a bicycle. However, the coupling device cooperated with the swivel mechanism generally positions the brake cables by way of threading a bolt to forcefully engage the cable, such as disclosed in FIGS. 2 and 4 of U.S. Pat. No. 4,616,523 entitled as "Bicycle Brake Cable Coupling Means".

FIG. 1 shows an illustrative view of a brake cable 31 positioned in a coupling element 41 by threading a bolt 42 transversely in the coupling element 41 to fixedly contact the brake cable 31 in position. However, the bolt 42 could loosen after being used for a period of time and the brake cable 31 therefore could slip out from the coupling element 41, and this could cause a dangerous result for the rider.

The present invention intends to provide an improved coupling device which securely positions the brake cables so as to mitigate and/or obviate the above-mentioned problems.

SUMMARY OF THE INVENTION

The present invention provides a coupling device which includes a frame having an upper end and a lower end, the upper end having a first flange extending transversely therefrom and the lower end having a second flange extending transversely therefrom. The first flange has a first threaded hole defined therethrough for a first bolt with a passage defined therein to be threadedly engaged therewith and the second flange having two first holes defined therethrough.

A connecting block comprises a first part and a second part which is connected to the first part. The first part has a first upper recess and two first lower recesses respectively defined therein and the second part has a second upper recess and two second lower recesses respectively defined therein. A first upper notch is defined in a top end of the first part and is in communication with the first upper recess, a second upper notch defined in a top end of the second part and in communication with the second upper recess. Two first lower notches are respectively defined in a lower end of the first part and are respectively in communication with the two first lower recesses, two second lower notches respectively defined in a lower end of the second part and respectively in communication with the two second lower recesses.

It is an object of the present invention to provide a coupling device used in a free-style bicycle.

It is another object of the present invention to provide a coupling device securely receiving brake cables therein.

Other objects, advantages, and novel features of the invention will become more apparent from the following detailed description when taken in conjunction with the accompanying drawings.

DETAILED DESCRIPTION OF THE PREFERRED EMBODIMENTS

Figure 2:
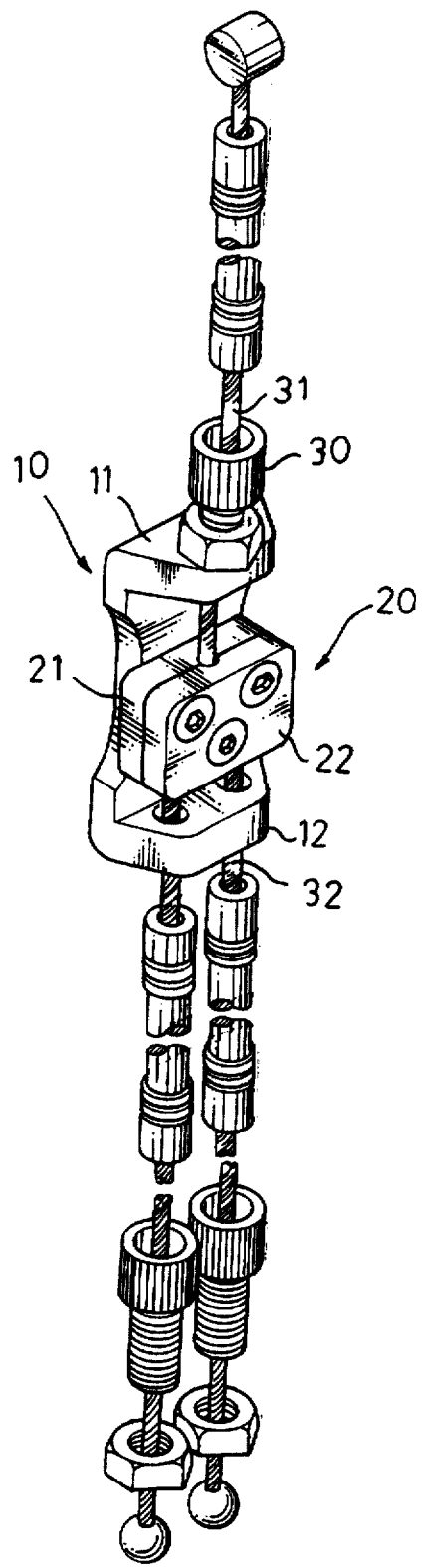
FIG. 2 is a perspective view of a coupling device in accordance with the present invention.
Figure 3:
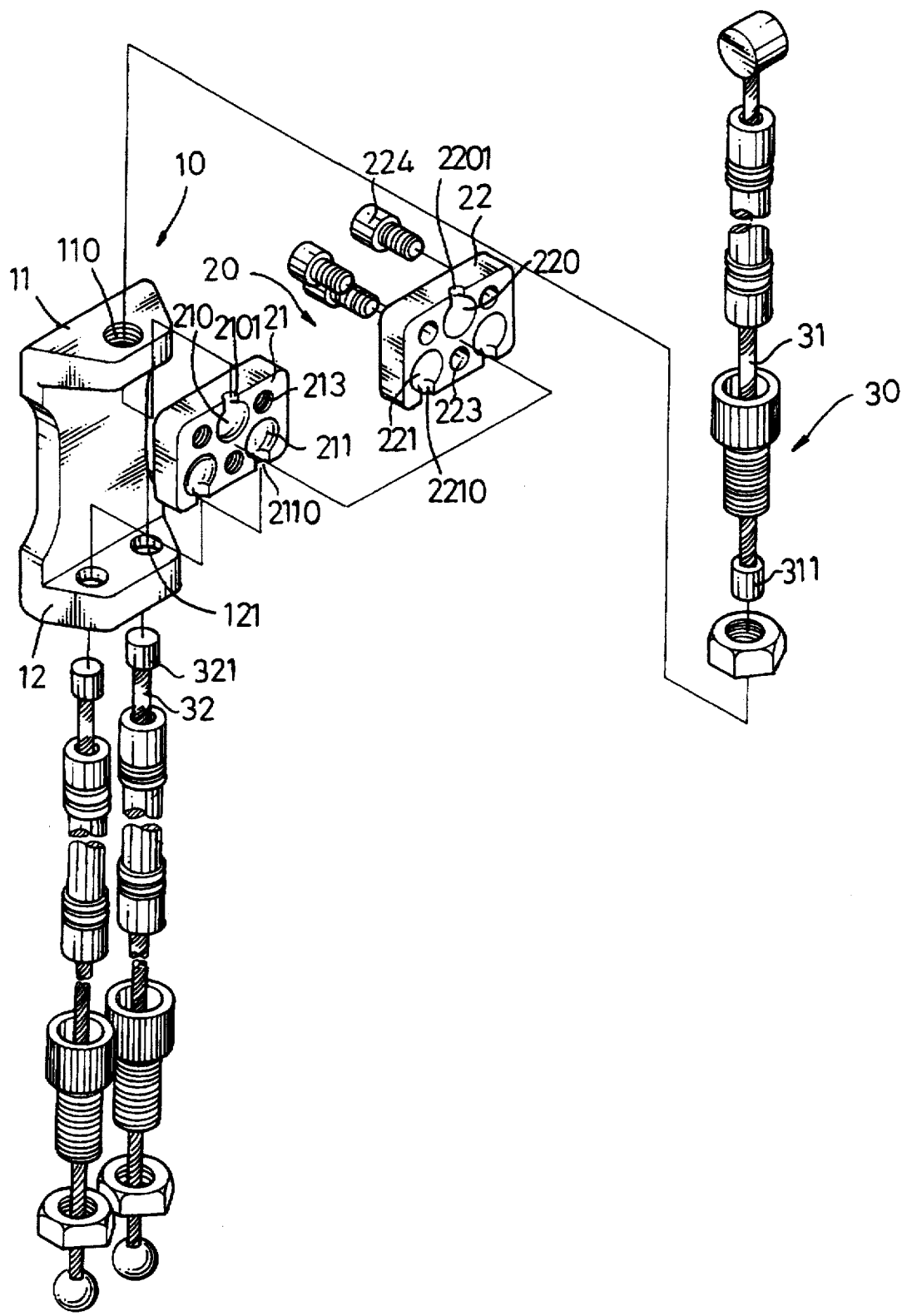
FIG. 3 is an exploded view of the coupling device in accordance with the present invention.
Figure 4:
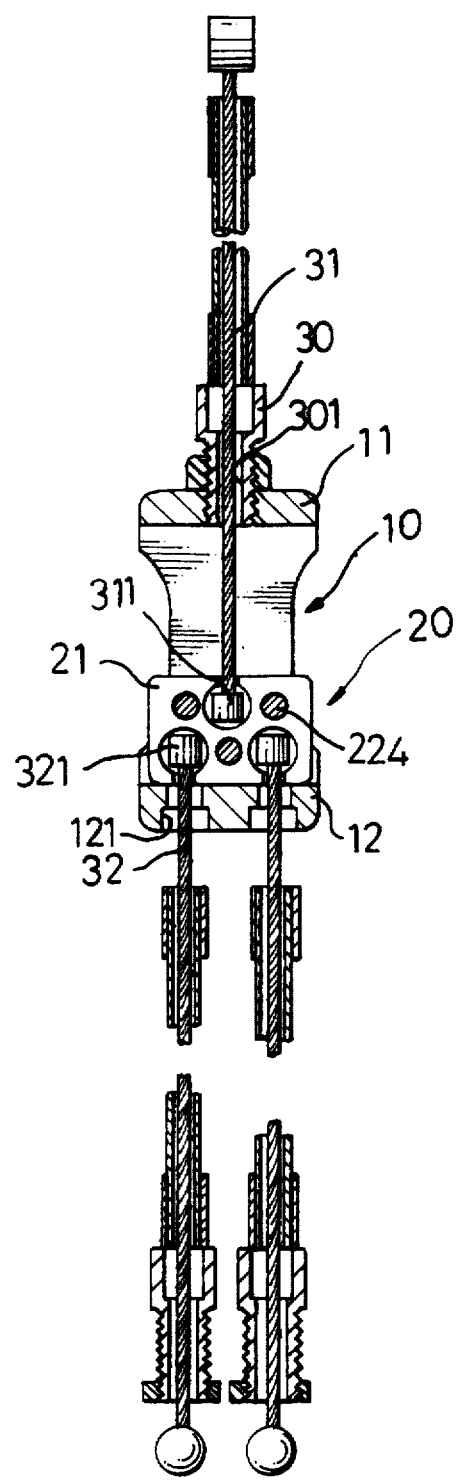
FIG. 4 is a front elevational view of the coupling device in accordance with the present invention.

Referring to the drawings and initially to FIGS. 2 through 4, a coupling device in accordance with the present invention generally includes a frame 10 having a upper end and a lower end, the upper end having a first flange 11 extending transversely therefrom and the lower end having a second flange 12 extending transversely therefrom. The first flange 11 has a first threaded hole 110 defined therethrough for a first bolt 30 threadedly engaged therewith wherein the first bolt 30 has a passage 301 defined longitudinally therethrough. A first brake cable 31 extends through the first bolt 30 and is extended from a brake lever mounted on a handlebar (both not shown). The second flange 12 has two first holes 121 defined perpendicularly therethrough.

A connecting block 20 is movably disposed between the first flange 11 and the second flange 12. The connecting block 20 comprises a first part 21 with three second threaded holes 213 defined therethrough and a second part 22 with three second holes 223 defined therethrough such that the second part 22 is connected to the first part 21 by extending three second bolts 224 through the second holes 223 and being engaged with the second threaded holes 213. The first part 21 has a first upper recess 210 and two first lower recesses 211 respectively defined therein, the second part 22 having a second upper recess 220 and two second lower recesses 221 respectively defined therein. The first part 21 has a first upper notch 2101 defined in a top end thereof and the first upper notch 2101 is in communication with the first upper recess 210. The second part 22 has a second upper notch 2201 defined in a top end thereof and the second upper notch 2201 is in communicating with the second upper recess 220. The first part 21 has two first lower notches 2110 respectively defined in a lower end thereof and the two first lower notches 2110 are respectively in communication with the two first lower recesses 211. The second part 22 has two second lower notches 2210 respectively defined in a lower end thereof and the two second lower notches 2210 are respectively in communication with the two second lower recesses 221.

When assembling the coupling device, a head 311 of the first brake cable 31 is extends through the passage 301 of the first bolt 30 and the first threaded hole 110 and is received in the first upper recess 210 and the second upper recess 220 wherein the first brake cable 31 received in the first upper notch 2101 and the second upper notch 2201. Two second brake cables 32 each have one end thereof connected to a rear brake mechanism of a bicycle (both not shown) and the other end of the two second brake cables 32 each have a head 321 which extends through the first hole 121 corresponding thereto and is respectively received in the first lower recess 211 and the second lower recess 221 with the second brake cables 32 respectively received in the corresponding first lower notch 2110 and the second lower notch 2210 as shown in FIG. 4. Because the first part 21 and the second part 22 are connected by the three second bolts 224 such that the first brake cable 31 and the two second brake cables 32 are securely received in the connecting block 20.

Figure 5:
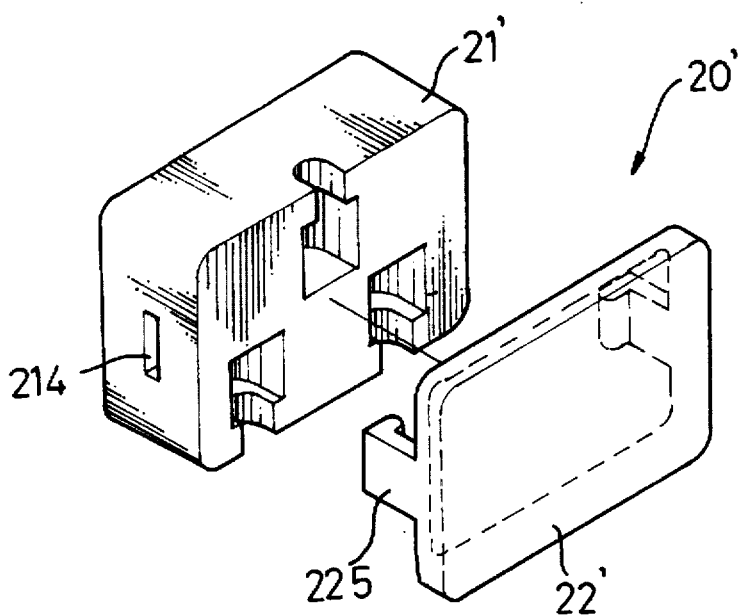
FIG. 5 is an exploded view of another embodiment of a connecting block of the coupling device in accordance with the present invention.
Figure 1:
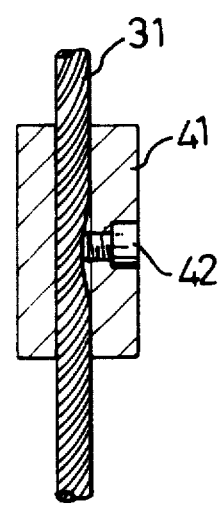
FIG. 1 is an illustrative view to show a brake cable received in a conventional coupling device by a bolt.

FIG. 5 shows another embodiment of the connecting block 20' which is composed of a third part 21' and a fourth part 22' wherein the third part 21' has the same structure as the first part 21 shown in FIG. 3 except for the second threaded holes 213. The third part 21' has two receiving notches 214 defined in opposite sides thereof. The fourth part 22' is simply a board with two plane surfaces and the fourth part 22' has second two hook members 225 extending from opposite sides thereof so as to be respectively received in the corresponding receiving notches 214 of the third part 21'.

Although the invention has been explained in relation to its preferred embodiment, it is to be understood that many other possible modifications and variations can be made without departing from the spirit and scope of the invention as hereinafter claimed.

What is claimed is:

1. A coupling device comprising:

a frame having an upper end and a lower end, said upper end having a first flange extending transversely therefrom and said lower end having a second flange extending transversely therefrom, said first flange having a first threaded hole defined therethrough and said second flange having two first holes defined therethrough;

a first bolt threadedly engaged into said first threaded hole of said first flange and having a passage defined longitudinally therethrough, and a connecting block movably disposed between said first flange and said second flange, said connecting block comprising a first part and a second part which is connected to said first part, said first part having a first upper recess and two first lower recesses respectively defined therein, said second part having a second upper recess and two second lower recesses respectively defined therein, said first part having a first upper notch defined in a top end thereof and said first upper notch communicating with said first upper recess, said second part having a second upper notch defined in a top end thereof and said second upper notch communicating with said second upper recess, said first part having two first lower notches respectively defined in a lower end thereof and said two first lower notches respectively communicating with said two first lower recesses, said second part having two second lower notches respectively defined in a lower end thereof and said two second lower notches respectively communicating with said two second lower recesses.

2. The coupling device as claimed in claim 1 wherein said first part has at least two second threaded holes defined therein and said second part has at least two second holes defined therethrough, said first part and said second part being connected by two second bolts respectively inserted through said two second holes and engaged with said second threaded holes of said first part.

3. The coupling device as claimed in claim 1 wherein said first part has two receiving notches defined in opposite sides thereof and said second part has two hook members extending from opposite sides thereof so as to be respectively received in said receiving notches corresponding thereto.

* * * * *

UNITED STATES PATENT AND TRADEMARK OFFICE
CERTIFICATE OF CORRECTION

PATENT NO.    : 5,732,601
DATED         : March 24, 1998
INVENTOR(S)   : Kirino et al.

It is certified that error appears in the above-identified patent and that said Letters Patent is hereby corrected as shown below:

Column 4,
Line 58, delete "trail" insert -- trial --.

Column 12,
Lines 44 and 52, delete "trail" insert -- trial --.

Claim 11,
Line 12, delete "trail" insert -- trail --;
Line 17, after "medium" insert -- is generated --.

Signed and Sealed this

Sixteenth Day of April, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 5,732,601
DATED        : March 31, 1998
INVENTOR(S)  : Chin-chang Wu It is certified that error appears in the above-identified patent and that said Letters Patent is hereby corrected as shown below:

This certificate supersedes Certificate of Correction issued April 16, 2002, the number was erroneously mentioned and should be vacated since no Certificate of Correction was granted.

Signed and Sealed this

Twenty-first Day of January, 2003

JAMES E. ROGAN
*Director of the United States Patent and Trademark Office*